US012802561B2

(12) United States Patent
Bobier-Tiu et al.

(10) Patent No.: US 12,802,561 B2
(45) Date of Patent: Nov. 17, 2026

(54) SYSTEMS AND METHODS FOR INTERSECTION MITIGATION FOR VEHICLES

(71) Applicant: Toyota Jidosha Kabushiki Kaisha, Aichi-ken (JP)

(72) Inventors: Carrie Bobier-Tiu, Sunnyvale, CA (US); Julia Pralle, Palo Alto, CA (US); Matthew J. Brown, Palo Alto, CA (US); Zhaoyuan Huo, Palo Alto, CA (US); Stephanie Lefevre, Palo Alto, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 200 days.

(21) Appl. No.: 18/428,614

(22) Filed: Jan. 31, 2024

(65) Prior Publication Data

US 2025/0246071 A1 Jul. 31, 2025

(51) Int. Cl.
*G08G 1/01* (2006.01)
*G08G 1/09* (2006.01)

(52) U.S. Cl.
CPC ......... *G08G 1/0145* (2013.01); *G08G 1/0112* (2013.01); *G08G 1/093* (2013.01)

(58) Field of Classification Search
CPC ..... G08G 1/0145; G08G 1/0112; G08G 1/093
USPC .......................................................... 701/117
See application file for complete search history.

(56) References Cited

U.S. PATENT DOCUMENTS

| | | | | |
|---|---|---|---|---|
| 6,516,273 | B1 * | 2/2003 | Pierowicz | G08G 1/096783 340/929 |
| 9,035,797 | B2 | 5/2015 | Varma | |
| 9,841,768 | B2 | 12/2017 | Hiramatsu et al. | |
| 9,965,951 | B1 * | 5/2018 | Gallagher | G08G 1/065 |
| 10,102,747 | B2 * | 10/2018 | Gage | G08G 1/096783 |
| 10,490,068 | B2 * | 11/2019 | Nascimento | G08G 1/0129 |
| 10,694,322 | B2 * | 6/2020 | Ajmeri | H04W 4/021 |
| 11,200,802 | B1 * | 12/2021 | Edwardson | G08G 1/005 |
| 11,380,194 | B2 * | 7/2022 | Sze | G08G 1/096716 |
| 11,386,779 | B2 * | 7/2022 | Nascimento | H04W 4/44 |
| 11,430,334 | B2 | 8/2022 | Takaki | |
| 11,747,827 | B2 * | 9/2023 | Xu | G05D 1/0293 701/482 |
| 11,816,981 | B2 * | 11/2023 | Dulberg | G08G 1/0116 |
| 11,820,365 | B2 | 11/2023 | Shalev et al. | |
| 11,854,387 | B2 * | 12/2023 | Sze | B60W 30/18154 |

(Continued)

FOREIGN PATENT DOCUMENTS

EP 4180768 A1 5/2023

*Primary Examiner* — Luis A Martinez Borrero
(74) *Attorney, Agent, or Firm* — Dinsmore & Shohl LLP

(57) ABSTRACT

In one embodiment, a method of providing intersection mitigation for a vehicle includes receiving vehicle location data, comparing the vehicle location data to map data, where the map data includes a plurality of intersection zones, each intersection zone encompassing an intersection between two or more roads, when the vehicle location data indicates the vehicle is outside of an intersection zone of the plurality of intersection zones, disabling one or more intersection mitigation features, and when the vehicle location data indicates that the vehicle is within an intersection zone of the plurality of intersection zones, enabling the one or more intersection mitigation features.

20 Claims, 11 Drawing Sheets

(56) References Cited

U.S. PATENT DOCUMENTS

| | | | | |
|---|---|---|---|---|
| 2012/0095646 | A1* | 4/2012 | Ghazarian | G01S 19/17 340/905 |
| 2013/0063281 | A1* | 3/2013 | Malaska | G08G 1/095 340/905 |
| 2016/0027300 | A1* | 1/2016 | Raamot | G08G 1/0145 340/922 |
| 2017/0301232 | A1* | 10/2017 | Xu | G01C 21/3867 |
| 2018/0047286 | A1* | 2/2018 | Gage | G08G 1/07 |
| 2018/0122234 | A1* | 5/2018 | Nascimento | G08G 1/093 |
| 2018/0122237 | A1* | 5/2018 | Nascimento | G08G 1/005 |
| 2018/0286228 | A1* | 10/2018 | Xu | G08G 1/0145 |
| 2019/0250639 | A1* | 8/2019 | Xu | G05D 1/0293 |
| 2020/0090505 | A1* | 3/2020 | Nascimento | H04W 4/44 |
| 2020/0216091 | A1* | 7/2020 | Vladimerou | G06V 20/597 |
| 2020/0242922 | A1* | 7/2020 | Dulberg | G08G 1/166 |
| 2021/0158693 | A1* | 5/2021 | Sze | G08G 1/0133 |
| 2021/0327264 | A1* | 10/2021 | Raamot | G08G 1/0145 |
| 2022/0009491 | A1* | 1/2022 | Taruoka | B60W 30/18154 |
| 2022/0044557 | A1* | 2/2022 | Li | G08G 1/0129 |
| 2022/0126864 | A1* | 4/2022 | Moustafa | B60W 60/0013 |
| 2022/0351615 | A1* | 11/2022 | Sze | B60W 30/18154 |
| 2022/0415168 | A1* | 12/2022 | Barlow | G08G 1/0116 |
| 2023/0113684 | A1* | 4/2023 | Naga | H04W 24/04 370/241 |
| 2023/0115290 | A1* | 4/2023 | Ogawa | H04L 67/1095 701/24 |
| 2023/0192089 | A1* | 6/2023 | Xu | B60W 30/181 701/26 |
| 2023/0354002 | A1* | 11/2023 | Shuman | G08G 1/096725 |
| 2024/0255307 | A1* | 8/2024 | Lin | G01C 21/3848 |
| 2025/0014462 | A1* | 1/2025 | Ghods | G08G 1/0141 |
| 2026/0141804 | A1* | 5/2026 | Germain | G08G 1/087 |

* cited by examiner

TL Intervene Logic Table

| INTERVENE as long as at least one of the cases below is TRUE | | | | | |
|---|---|---|---|---|---|
| Conditions | Cases are TRUE IF all selected conditions are met | | | | |
| | Case 1 | Case 2 | Case 3 | Case 4 | Case 5 |
| System is intervening | | | | | |
| Required braking is needed within system capability | | | | | |
| Required braking needed is low or moderate | | | | | |
| Violation confidences is high | | | | | |
| Violation confidence is moderate or high | | | | | |
| Driver pushing brake pedal | | | | | |
| Driver increasing acceleration | | | | | |
| Red or Yellow TL | | | | | |

FIG. 8

SYSTEMS AND METHODS FOR INTERSECTION MITIGATION FOR VEHICLES

BACKGROUND

Vehicles may include advanced features, such as cross traffic collision avoidance and traffic light warning systems. These features aid the driver in successfully navigating the environment, such as through intersections. For example, a cross traffic collision avoidance feature may warn the driver of a risk of a cross traffic collision in an intersection so that the driver may take appropriate action. A traffic light warning system may provide the driver with a notification regarding the status of an upcoming traffic light (e.g., red, yellow or green).

These advanced features use sensor data, such as image sensor data. However, in some cases the advanced features may produce a warning or other output that is a false positive. For example, the image sensor data may detect something in environment when the vehicle is not near an intersection that looks like a traffic light but is not. The traffic light warning system may produce a notification regarding a traffic light that does not exist. Such an erroneous warning or message may cause the driver to lose confidence in the driving system.

Accordingly, alternative advanced vehicle features that reduce false positives may be desired.

BRIEF SUMMARY

In one embodiment, a method of providing intersection mitigation for a vehicle includes receiving vehicle location data, comparing the vehicle location data to map data, where the map data includes a plurality of intersection zones, each intersection zone encompassing an intersection between two or more roads, when the vehicle location data indicates the vehicle is outside of an intersection zone of the plurality of intersection zones, disabling one or more intersection mitigation features, and when the vehicle location data indicates that the vehicle is within an intersection zone of the plurality of intersection zones, enabling the one or more intersection mitigation features.

In one embodiment, a vehicle includes a location sensor, one or more processors, and a non-transitory memory storing instructions that, when executed by the one or more processors, causes the one or more processors to receive vehicle location data from the location sensor, compare the vehicle location data to map data, where the map data includes a plurality of intersection zones, each intersection zone encompassing an intersection between two or more roads, when the vehicle location data indicates the vehicle is outside of an intersection zone of the plurality of intersection zones, disable one or more intersection mitigation features, and when the vehicle location data indicates that the vehicle is within an intersection zone of the plurality of intersection zones, enable the one or more intersection mitigation features.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates an example table summarizing the logic of FIG. 7 according to one or more embodiments described and illustrated herein.

DETAILED DESCRIPTION

Figure 1:
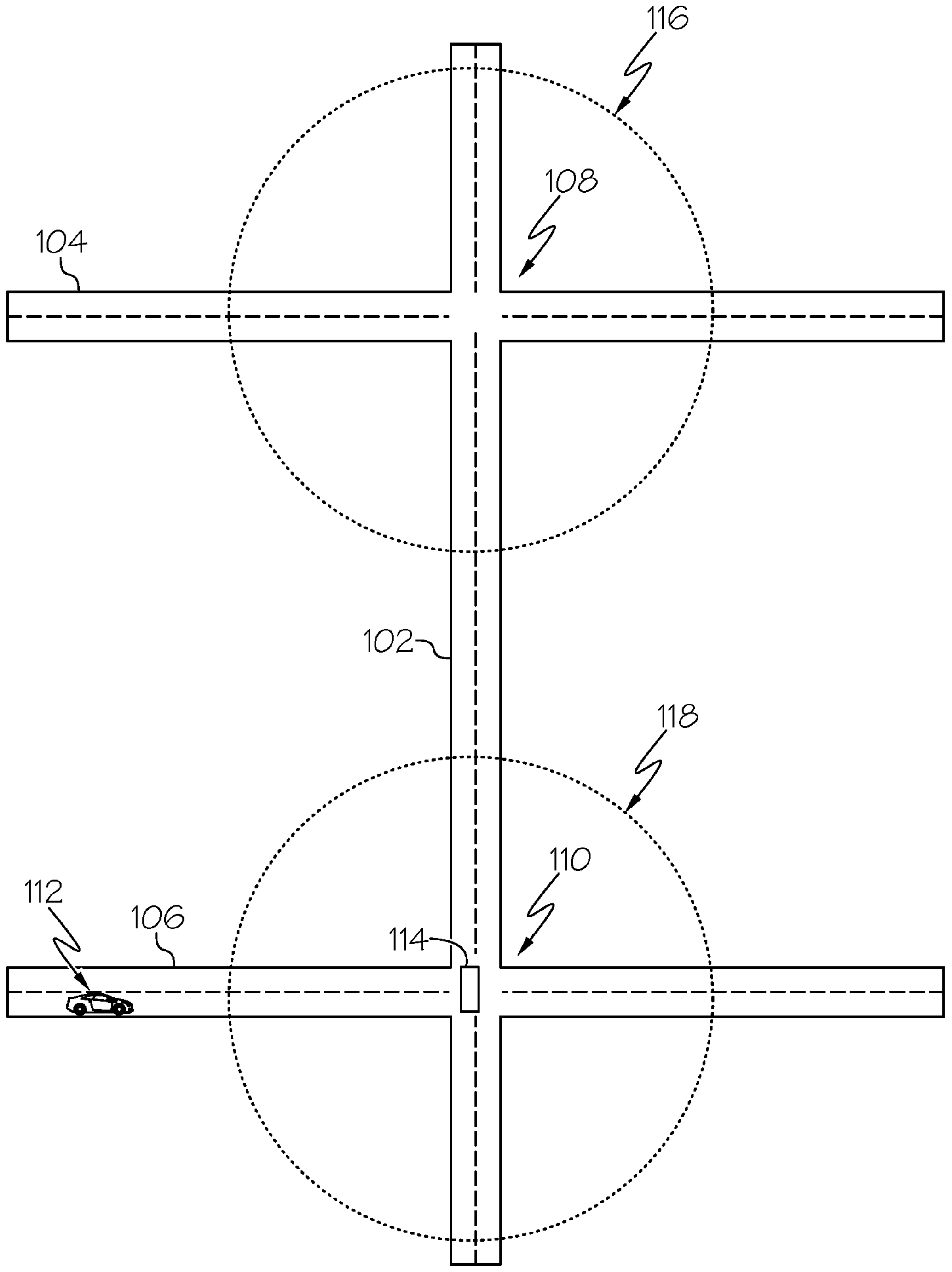
FIG. 1 illustrates an example environment for operation of a vehicle according to one or more embodiments described and illustrated herein.

Embodiments of the present disclosure are directed to systems and methods for providing advanced vehicle features, such as features that provide intersection mediation. Non-limiting examples include a traffic light mitigation feature and a cross traffic mitigation feature that issue messages, warnings, and/or interventions based on sensor data. The intersection mediation features of the present disclosure eliminate or substantially minimize false positives by enabling such features only when the vehicle is present within a vicinity of an intersection. Thus, the vehicle will not issue messages, warnings, and/or interventions when the vehicle is not approaching or within an intersection. False positives can erode a driver's confidence in the vehicle system. Further, such false positives can be unnerving to a driver, for example, when a traffic light message appears on an electronic display of the vehicle and there no intersection or traffic light in the vehicles surroundings, or the vehicle sends an auditory and/or visual warning that there is a risk of a cross traffic collision when the vehicle is not approaching an intersection. These false positives may be generated by erroneous sensor data, edge cases that a trained model as not encountered, or any other reason.

In addition to enabling intersection mediation features only when the vehicle is proximate an intersection, embodiments also include logic to ensure proper action is taken, such as proper action regarding traffic light status and cross traffic collision. In the embodiments described herein, each of the intersection mediation features generates three types of actions ranging from least urgent to most urgent: messaging, warning, and intervening. The messaging output may present a visual warning on an electronic display, such as a heads-up display (HUD), an instrument cluster display, and/or a head unit of an infotainment system. For example, an icon representing a yellow or red traffic light may be presented to the user on one or more of the displays.

The warning is produced in scenarios more urgent than those appropriate for a message. The warning may also include a visible message on one or more electronic displays with the addition of audio warnings and/or haptic feedback warnings. In some embodiments, the visual messages for the warning may be more prominent than those for the messages, such as larger icons and/or bolder colors. The audio warnings may be any auditory sound, such as chimes, beeps, alarm sounds, spoken words, and the like. The haptic feedback warning may be produced by one or more actuators within the vehicle, such as within the seat and/or within the steering wheel.

The intervention output includes the outputs of both the messaging and the warning, and also applies physical intervention by autonomously controlling the vehicle, such as by applying the brakes of the vehicle so that the vehicle can stop at intersection of the traffic light, or stop in time to avoid a collision with a cross traffic vehicle.

Various embodiments of systems and methods for providing intersection mitigation for a vehicle are described in more detail below.

Referring now to FIG. 1, an environment in which a vehicle 112 is travelling is illustrated. The illustrated environment comprises road 102, road 104 and road 106. Both road 104 and road 106 intersect road 102 at intersection 108 and intersection 110, respectively. The vehicle is approaching intersection 110, which has a traffic light 114, which may be in a state of green, yellow or red. The vehicle 112 is equipped with a traffic light mitigation feature that is operable to message, warn or intervene control of the vehicle 112 depending on the urgency of the driving scenario.

As stated above, false positives regarding traffic lights can have a negative effect on the driver. In embodiments of the present disclosure, an intersection zone is defined around each intersection within a map, such as a HD map. FIG. 1 illustrates an intersection zone 116 surrounding intersection 108, and an intersection zone 118 surrounding intersection 110. The intersection zones may be defined by a circle having a certain desired radius but embodiments are not limited thereto.

The intersection mitigation features described herein are only enabled when the vehicle is in an intersection zone. Otherwise, the intersection mitigation features are disabled. Thus, if the system of vehicle 112 detects a traffic light based on collected image data, it will not trigger activation a traffic light mitigation feature when the vehicle 112 is outside of an intersection zone. Only when the vehicle 112 is within intersection 108 will the various intersection mitigation features, such as the traffic light mitigation feature, be enabled.

The system may use location data from a location sensor, such as a global positioning system sensor, to understand the location of the vehicle. The location of the vehicle is then compared with map data, such as HD map data, having the intersection zones stored therein. Thus, the intersection zones provide geofenced areas in which to enable the intersection mitigation features described herein.

When vehicle 112 is within intersection zone 118, the traffic light mitigation feature may be enabled. Image sensor data (or other sensor data) is used to determine the state of the traffic light 114, which may be green, yellow or red. In some embodiments, an object recognition algorithm, a classifier, or other image processing algorithm is used to determine the state of the traffic light. Depending on the state of the traffic light 114, the traffic light mitigation feature will take no action, issue a message, issue a warning, intervene, or take some combination thereof.

Figure 2:
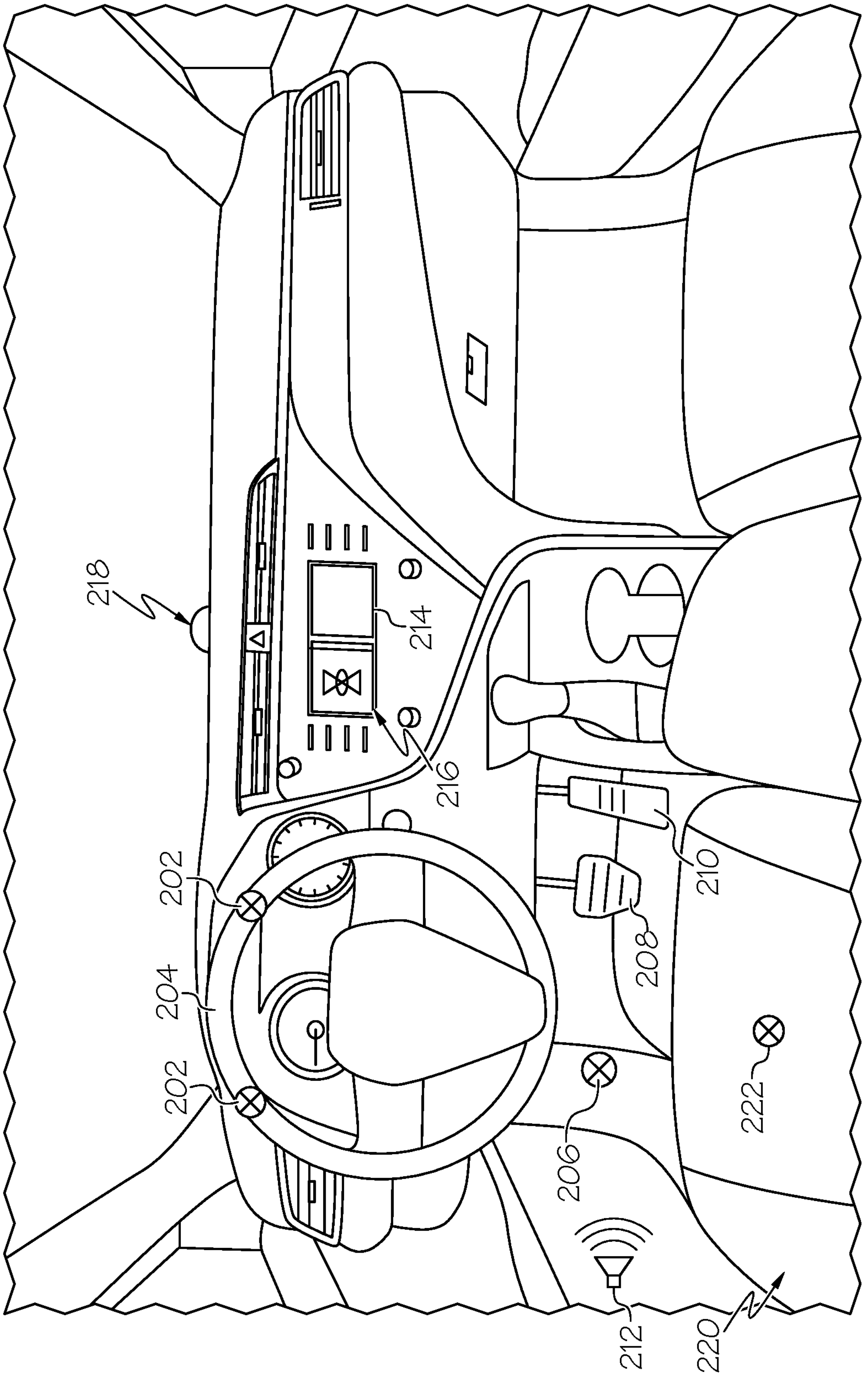
FIG. 2 illustrates an example vehicle cabin of a vehicle according to one or more embodiments described and illustrated herein.

FIG. 2 illustrates an example vehicle cabin of a vehicle 112 according to embodiments of the present disclosure. It should be understood that FIG. 2 is provided for illustrative purposes only, and that other configurations for a vehicle cabin may be utilized. The example vehicle 112 includes one or more image sensors 218, such as cameras. The image sensors 218 may be positioned around an entirety of the vehicle 112. Other sensors may also be utilized, such as proximity sensors, radar sensors, lidar sensors, and the like. The image sensors 218 captures data regarding the environment, such as the presence and status of a traffic light or a cross traffic vehicle at an intersection, for example.

The example vehicle cabin further includes at least one electronic display 214, such as a head-unit display as shown in FIG. 2. Other example displays include an instrument cluster display and a HUD projected on the windshield of the vehicle 112. As described in more detail below, the at least one electronic display 214 is configured to display a message icon 216, such as an icon indicating a status of a traffic light, for example.

In some embodiments, one or more haptic actuators 202 may be provided within the steering wheel 204 and/or a seat 220 of the vehicle. The haptic actuators 202 are used to produce vibrations to provide haptic feedback to the driver when issuing an intersection mitigation warning as described in more detail below. One or more speakers 212, such as the speakers of the vehicle's audio system, are used to produce audio warnings when the intersection mitigation system warns the driver.

The example vehicle cabin also includes one or more pedal sensors 206 to monitor the position of the driver's foot on the brake pedal 208 and the accelerator pedal 210. The pedal sensor 206 shown in FIG. 2 is an image sensor. However, other sensors may be used, such as a contact sensor on the brake pedal 208 and accelerator pedal 210 surfaces, or an encoder that measures the displacement of the brake pedal 208 and the accelerator pedal 210. Other means for determining whether or not the driver's foot is on the brake pedal 208 or the accelerator pedal 210 may be utilized. As described in more detail below, the status of the driver's foot with respect to the brake pedal 208 and the accelerator pedal 210 is used in determining what type of output the intersection mitigation system produces.

To further reduce false traffic light positives, embodiments of the present disclosure employ logic that is followed to ensure proper action is taken. There is logic for each output of message, warn and intervene.

Figure 3:
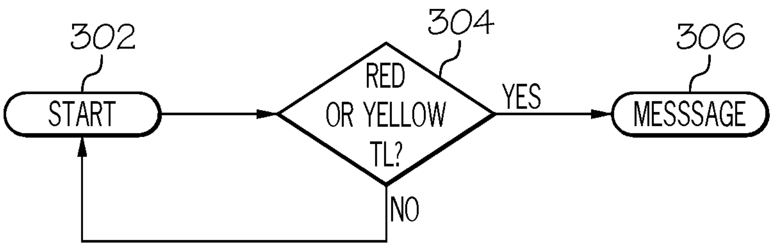
FIG. 3 illustrates example logic for producing a traffic light message according to one or more embodiments described and illustrated herein.

FIG. 3 illustrates example logic for when the system produces a message output. As stated above, the message output is the least urgent of the three outputs of the traffic light mitigation feature. The logic of FIG. 3 is only executed when the vehicle 112 is within an intersection zone. The process starts at block 302, where image data from the one or more image sensors 218 is gathered and analyzed. An image processing algorithm is used to detect a traffic light 114 and also the state of the traffic light. As one example, the image processing algorithm employs a classifier that is used to classify the image data as at least a red light, a yellow light, or a green light. Any known or yet-to-be developed machine learning classifier may be used. Other methods of determining the status of the traffic light 114 may be utilized.

After determining the status of the traffic light 114, the process moves to block 304 where it is determined whether or not the status of the traffic light is red or yellow. If no, i.e., the status of the traffic light 114 is green, the process moves back to block 302 where additional image data is gathered. If the answer is yes at block 304, then the process moves to block 306 where the traffic mitigation system produces a message output, which is the least urgent of the three outputs. As stated above, the message output is in the form of an informative visual graphic or icon that is shown on the one or more electronic displays 214 within the vehicle cabin. As one example, the informative visual graphic is a message icon 216 in the form of a traffic light showing the traffic light at yellow or green.

Figure 4:
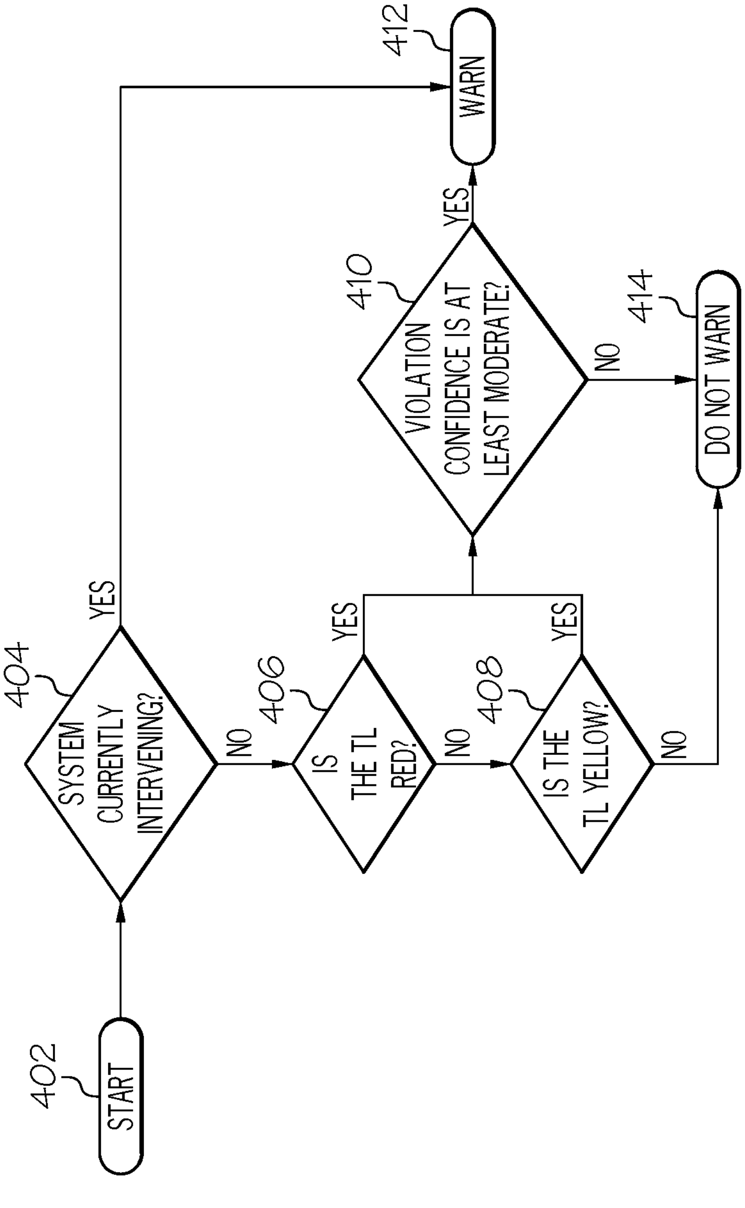
FIG. 4 illustrates example logic for producing a traffic light warning according to one or more embodiments described and illustrated herein.

The warning output of the intersection mitigation system has an urgency that is greater than that of the message output. FIG. 4 illustrates example logic for when the intersection mitigation system produces a warning output, which includes the message icon 216 of the message output as well as an audio warning and/or a haptic warning. The logic of FIG. 4 is only executed when the vehicle 112 is within an intersection zone. It is noted that the logic of FIG. 4 may be executed in parallel with the logic of FIG. 3.

The logic begins at block 402 where image data from the one or more image sensors 218 is gathered and analyzed. As described with respect to block 302 of FIG. 3, the status of the traffic light 114 is determined at block 402. The process proceeds to block 404 where it is determined if the vehicle system is currently intervening. The vehicle system intervenes by autonomously applying the brakes of the vehicle or in some cases autonomously applying the accelerator of the vehicle. If the answer is yes at block 404, the process proceeds to block 412 where the intersection mitigation system produces a warning.

If the answer is no at block 404, the process moves to block 406 where it is determined if the status of the traffic light 114 is red. If no, the process moves to block 408 where it is determined if the status of the traffic light 114 is yellow. If no, the process moves to block 414 where the intersection mitigation system does not produce a warning. The process may then return back to block 402 to continue to evaluate whether or not to issue a warning.

If the answer at block 406 or block 408 is no, the process moves to block 410 where it is determined if a violation confidence value is at least moderate. The violation confidence value is the likelihood that the vehicle 112 will not be able to stop at the intersection under current conditions.

Figure 5:
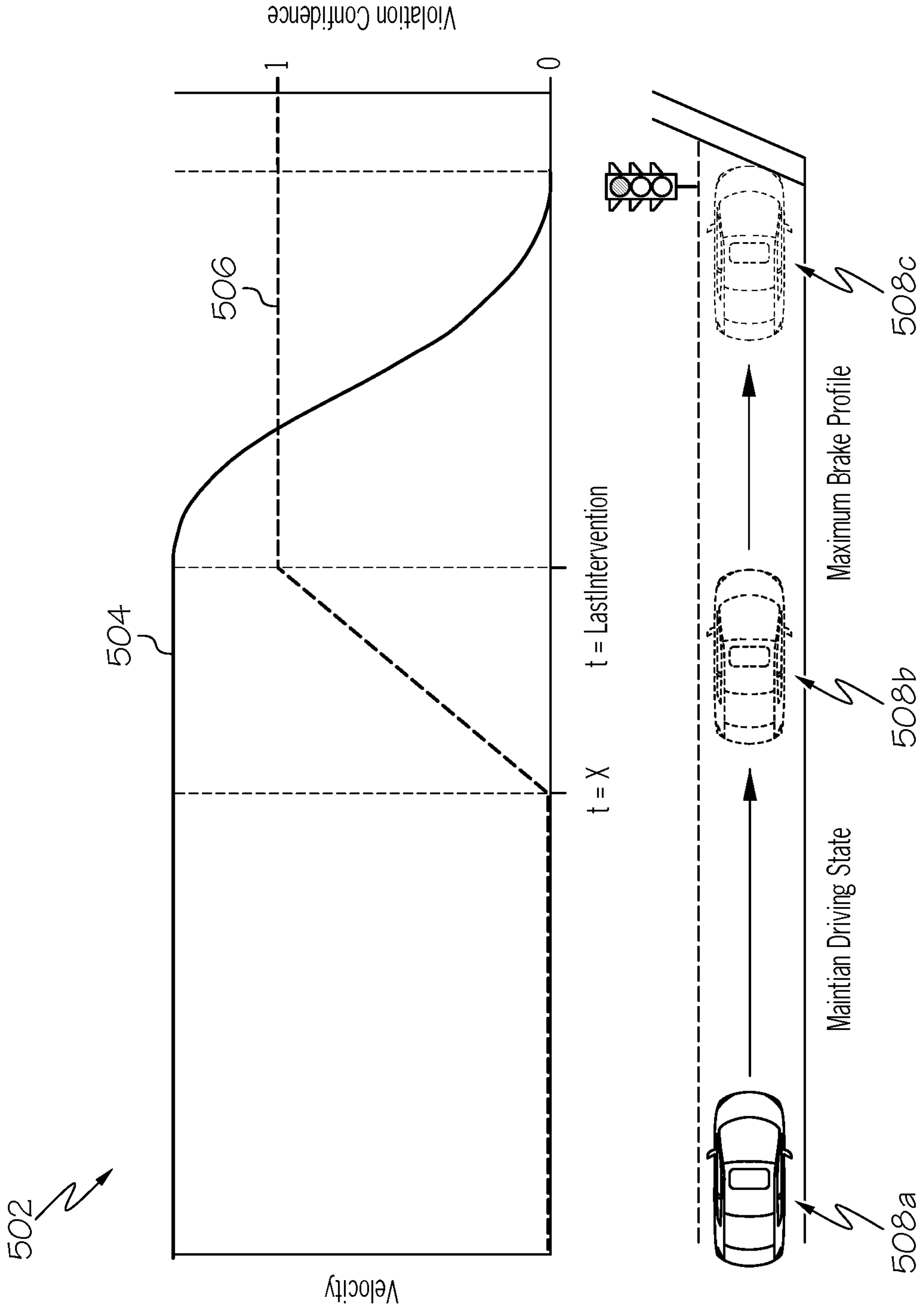
FIG. 5 illustrates an example plot illustrating calculation of a violation confidence value according to one or more embodiments described and illustrated herein.

Referring now to FIG. 5, a graph 502 illustrating the violation confidence value is provided. The graph illustrates curve 504 representing velocity versus time and curve 506, which plots a violation confidence value versus time. The system computes the last intervention value, which is the last possible time to intervene given the required stopping position of the intersection, the measured vehicle state (e.g., current velocity) and the dynamic limits of the vehicle (e.g., braking capabilities). The violation confidence value is set to 0 at some parameterized time t=x before the last intervention (e.g., 1 second). The violation confidence value then increases linearly to 1 at the last intervention. FIG. 5 also illustrates a vehicle 508*a* traveling toward the intersection prior to t=x where a warning would not be issued, the vehicle 508*b* within a zone having a warning output because the last intervention value is above a moderate threshold (e.g., 0.4), and the vehicle 508*c* stopped at the intersection either by manual braking or autonomous braking by intervention.

Referring once again to FIG. 4, when the violation confidence value is at least moderate (i.e., it is above some predetermined moderate threshold, such as 0.4 as a non-limiting example), the logic moves to block 412 where the output is a warning, which entails a visual output and one or more of an audio warning and a haptic warning.

Figure 6:
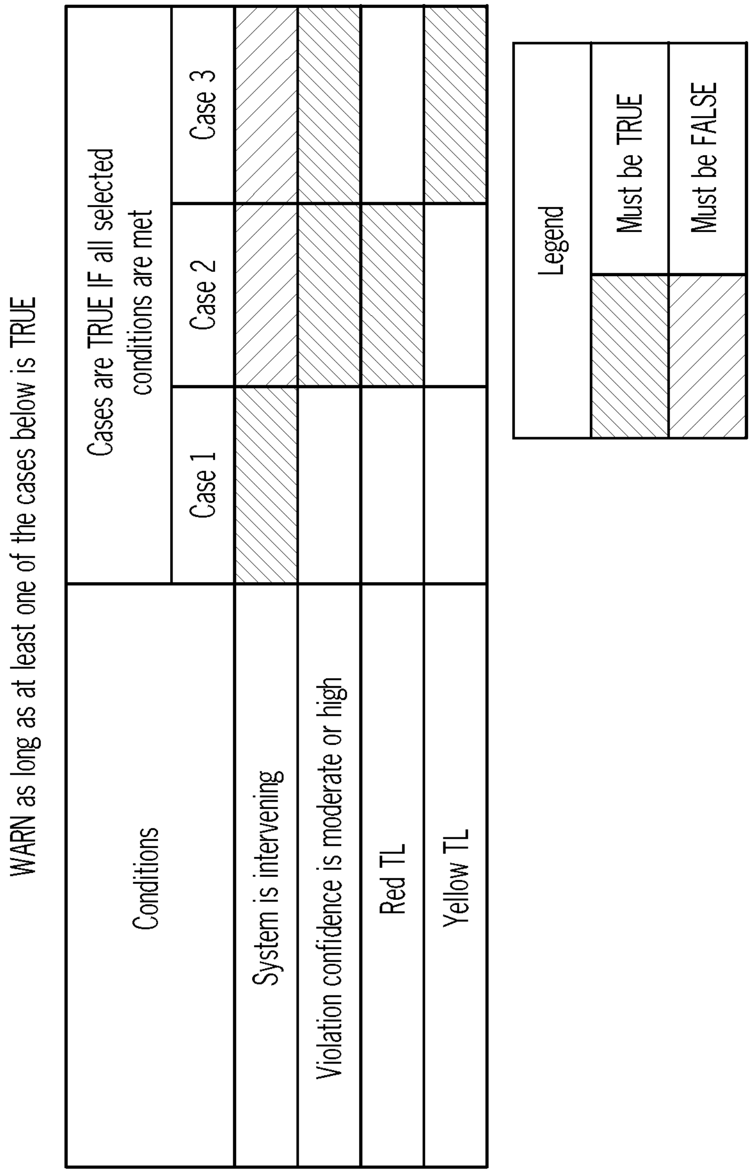
FIG. 6 illustrates an example table summarizing the logic of FIG. 4 according to one or more embodiments described and illustrated herein.

FIG. 6 is a chart that summarizes the warning logic of FIG. 4 for three individual cases. A warning is issued for each case if all of the selected conditions are met. For Case 1, the intersection mitigation system issues a warning when the system is currently intervening, irrespective of the violation confidence and the status of the traffic light 114. For Case 2, the intersection mitigation system issues a warning when the system is not currently intervening, the violation confidence value is at least moderate, and the traffic light 114 is red. For Case 3, the intersection mitigation system issues a warning when the system is not currently intervening, the violation confidence value is at least moderate, and the traffic light 114 is red.

Figure 7:
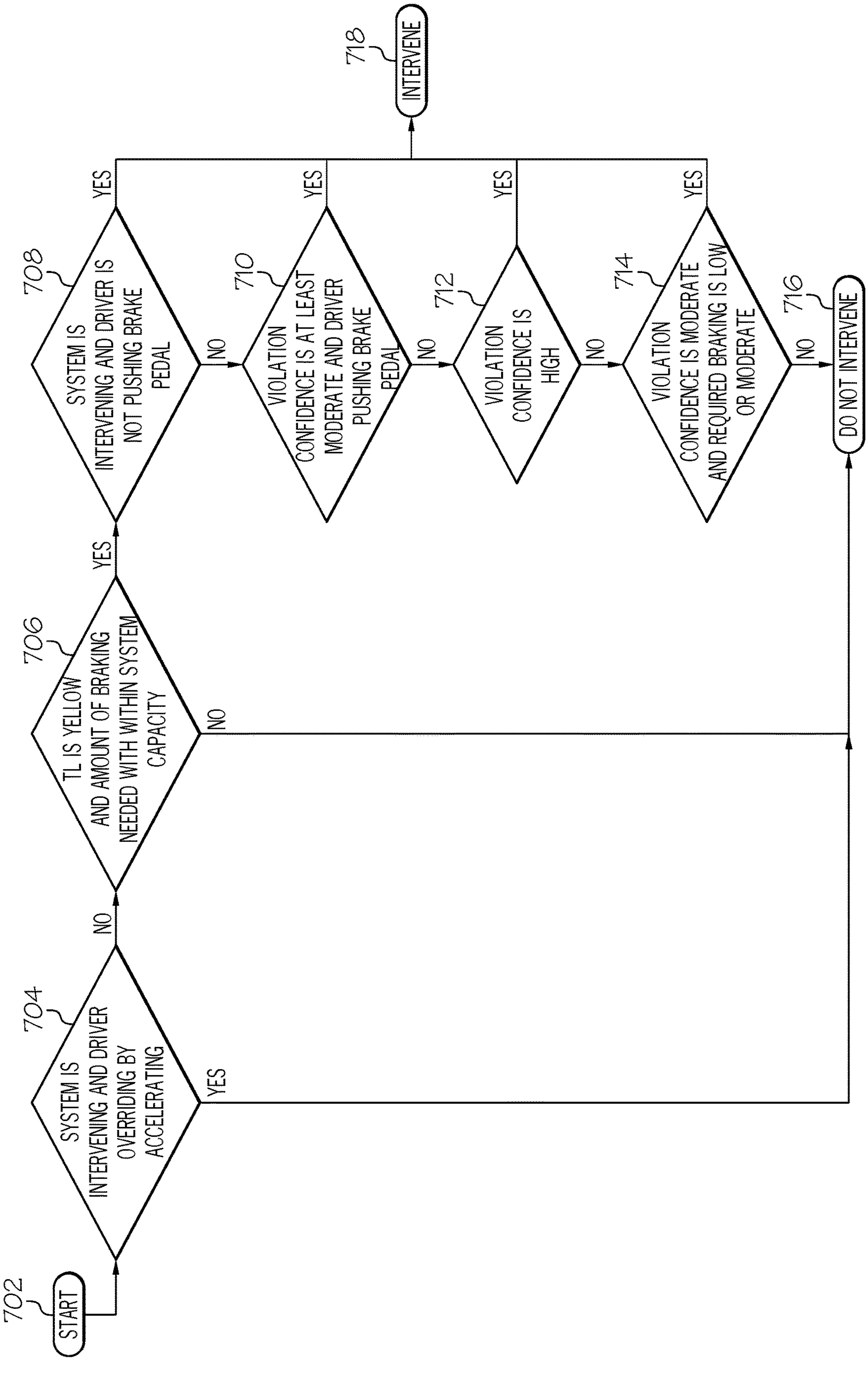
FIG. 7 illustrates example logic for producing a traffic light intervention according to one or more embodiments described and illustrated herein.

The intervention output of the intersection mitigation system has an urgency that is greater than that of the warning output. The intervention output includes taking over control of the longitudinal control of the vehicle 112 by braking so that the vehicle 112 stops at the intersection 108. FIG. 7 illustrates logic for when the intersection mitigation system produces an intervention output, which entails producing the message icon (i.e., a visual message), one or more of the audio warning and the haptic feedback warning, and autonomous braking of the vehicle.

As described with respect to block 302 of FIG. 3, the status of the traffic light 114 is determined at block 702. The process proceeds to block 704 where it is determined if the vehicle system is currently intervening and if the driver is presently trying to override the intervention by pressing the brake pedal 208 or the accelerator pedal 210. Feedback from one or more pedal sensors 206 is used to determine if the driver is attempting to override the intervention. If the answer is no at block 704, the process moves to block 716 where the intersection mitigation system stops the present intervention and allows the driver to control the vehicle 112 to a stop.

If the answer is no at block 704, the process moves to block 706 where it is determined whether the traffic light 114 is yellow and the amount of braking that is needed is within the vehicle system capacity. The amount of braking needed to stop accounts for the velocity of the vehicle and the distance to the stopping point. The vehicle 112 has braking capabilities, which are dependent on the make and model of the vehicle 112, and considers factors such as type of tires, brake pads, vehicle weight, and the like. The vehicle 112 may store the braking capabilities of the vehicle 112 to be used in the determination at block 706. If the answer is no at block 706, then the process moves to block 716 where no intervention is provided, either because the traffic light 114 is green or the traffic light 114 is yellow and the amount of braking needed exceeds the capabilities of the vehicle 112.

If the answer at block 706 is yes, then the process proceeds to block 708 where it is determined whether the system is intervening and the driver is not pushing the brake pedal. If the answer at block 708 is yes, the process moves to block 718 where the intervention continues. If the answer at block 708 is no, the process moves to block 710 where it is determined whether the violation confidence value is at least moderate and the driver is pushing the brake pedal. If the answer at block 710 is yes, the process moves to block 718 where the intersection mitigation system provides an intervention.

If the answer at block 710 is no, the process moves to block 712 where it is determined whether the violation confidence value is high, i.e., above some high threshold (e.g., 0.7). If the answer is yes, the process moves to block 718 where an intervention is provided.

If the answer at block 714 is no, the process moves to block 714 where it is determined whether the violation confidence is moderate (i.e., above some low threshold but below some high threshold) and the required braking is low or moderate (i.e., required braking is below some threshold), the process moves to block 718 where an intervention is provided. If the answer at block 714 is no, then the process moves to block 716 where no intervention is provided.

FIG. 8 is a chart that summarizes the intervention logic of FIG. 7 for five individual cases. An intervention is provided for each case if all of the selected conditions are met. For Case 1, the intersection mitigation system applies an intervention when the system is currently not intervening, the required braking that is needed is within the system capability, the violation confidence value is high, and the state of the traffic light is red or yellow. For Case 2, the intersection mitigation system applies an intervention when the system is currently not intervening, the required braking needed is within the system capability, the required braking needed is low or moderate, the violation confidence value is moderate or high, and the state of the traffic light is red or yellow. For Case 3, the intersection mitigation system applies an intervention when the system is currently not intervening, the required braking needed is within the system capability, the violation confidence value is moderate or high, the driver is applying the brake pedal, and the state of the traffic light is red or yellow. For Case 4, the intersection mitigation system applies an intervention when the system is currently intervening, the required braking needed is within the system capabilities, the driver is not pushing the brake pedal or the accelerator pedal, and the state of the traffic light is red or yellow. For Case 5, the intersection mitigation system applies an intervention when the system is currently intervening, the required braking needed is within the system capabilities, the violation confidence is moderate or high, the driver is pushing the brake pedal, the driver is not pushing the accelerator pedal, and the traffic light is red or yellow.

Figure 9:
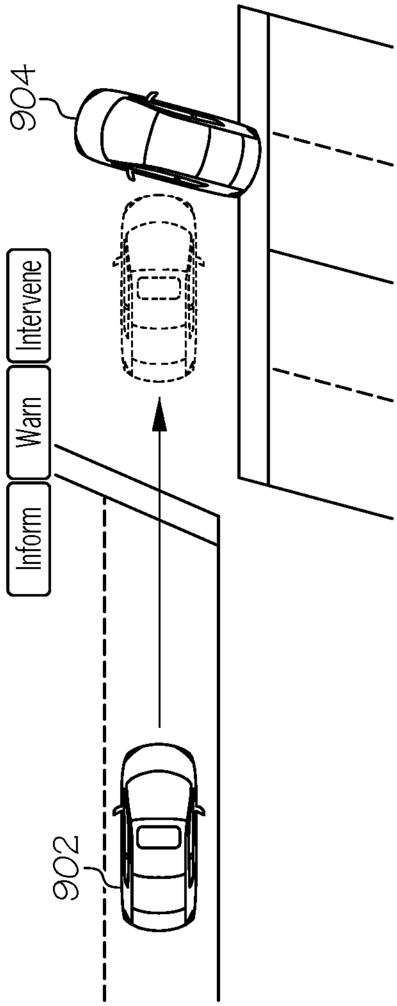
FIG. 9 illustrates an example environment for a cross traffic collision scenario according to one or more embodiments described and illustrated herein.

Referring now to FIG. 9, the intersection mitigation feature may be a cross traffic mitigation feature that operates in a manner similar to the traffic light mitigation feature described above. FIG. 9 illustrates an ego vehicle 902 approaching an intersection where vehicle 904 is traveling in a cross traffic situation. Based on a collision confidence value, which is calculated in a manner similar to the violation confidence value, the intersection mitigation system will message, warn or intervene as described above with respect to the traffic light feature.

Figure 10:
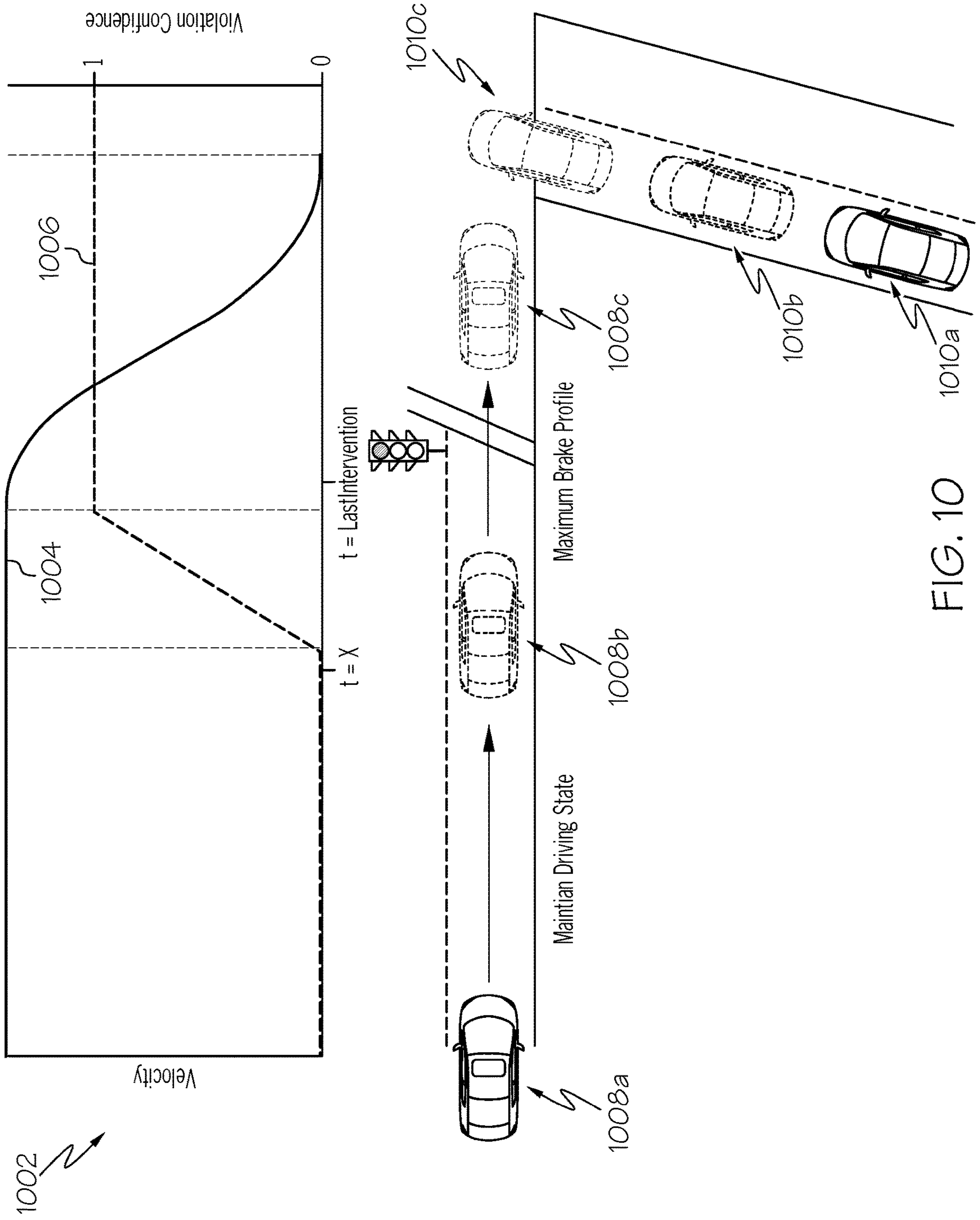
FIG. 10 illustrates an example plot illustrating calculation of a collision confidence value and an ego vehicle approaching a cross traffic vehicle according to one or more embodiments described and illustrated herein.

Referring now to FIG. 10, a graph plot 1002 illustrating the collision confidence value is provided. The graph illustrates curve 1004 representing velocity versus time and curve 1006, which plots a collision confidence value versus time. The system computes the last intervention value, which is the last possible time to intervene given the required stopping position to avoid a collision, the measured vehicle state (e.g., current velocity) and the dynamic limits of the vehicle (e.g., braking capabilities). The collision confidence value is set to 0 at some parameterized time t=x before the last intervention (e.g., 1 second). The collision confidence value then increases linearly to 1 at the last intervention. FIG. 10 also illustrates an ego vehicle 1008*a* traveling toward the intersection prior to t=x where a warning would not be issued (time t1), the ego vehicle 1008*b* within a zone having a warning output because the last intervention value is above a moderate threshold (e.g., 0.4) (time t2), and the ego vehicle 1008*c* stopped at the intersection either by manual braking or autonomous braking by intervention. FIG. 10 also illustrates a cross traffic vehicle 1010*a* at time t1, the cross traffic vehicle 1010*b* at time t2, and the cross traffic vehicle at time t3.

The collision confidence value may be generated by ballistic predictions using heuristic rules, by a machine learning model, or by a combination thereof. The ballistic prediction model uses kinematic rules to produce a heuristic collision confidence value regarding how likely a collision with a cross traffic vehicle will occur. The machine learning model uses a trained model to predict the likelihood of a collision with a cross traffic vehicle based on input parameters of the vehicle and observed parameters of the cross traffic vehicle. The machine learning model produces a machine learning collision confidence value. The cross traffic feature may use one or both of the heuristic collision confidence value and the machine learning collision confidence value. In embodiments that use both, both confidence values may be aggregated and discretized to combine both values. This combined collision confidence value may then be used when making the decision to produce a message, produce a warning, or intervene.

Figure 11:
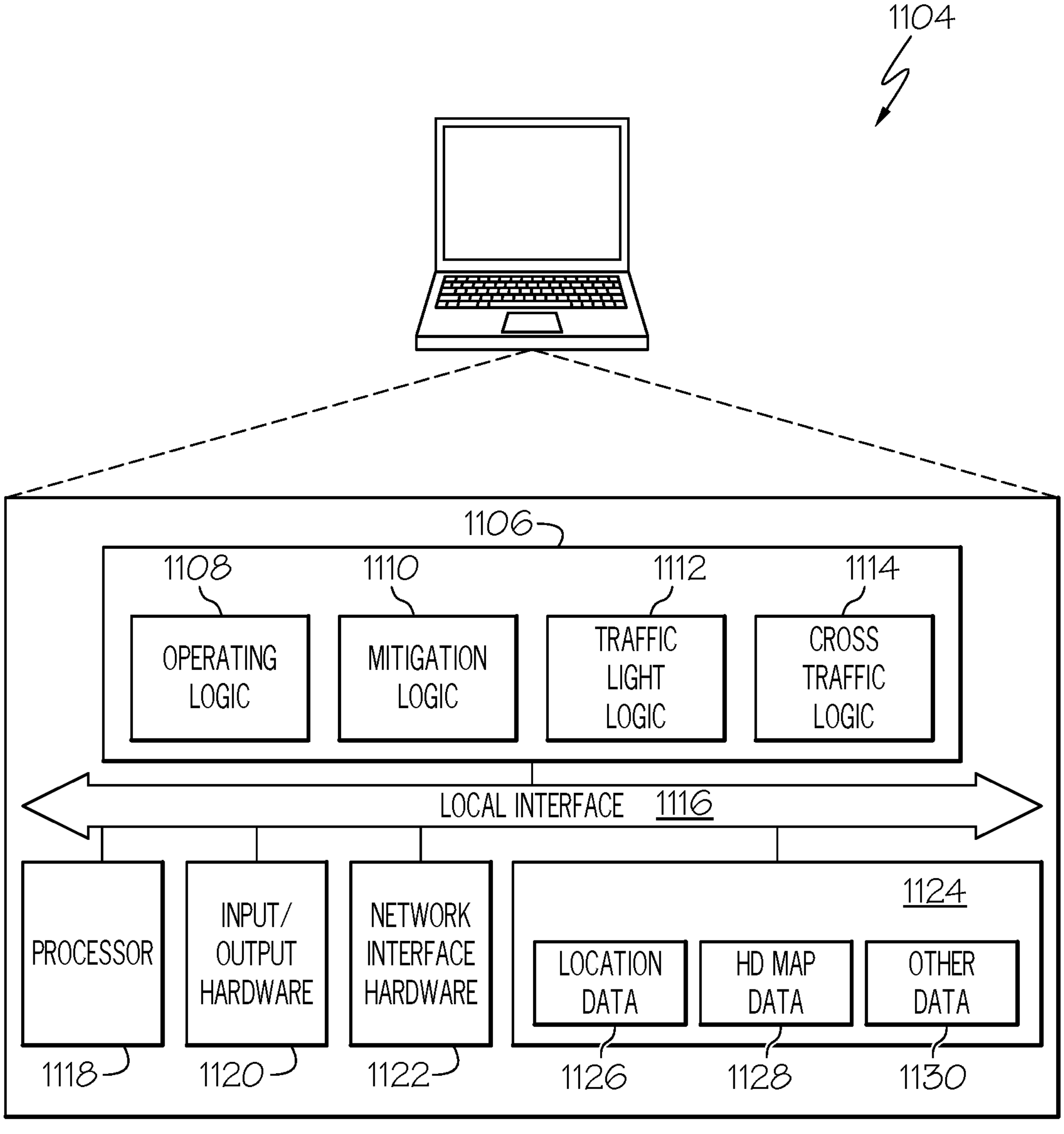
FIG. 11 illustrates an example computing system for providing intersection mitigation for a vehicle according to one or more embodiments described and illustrated herein.

Embodiments of the present disclosure may be implemented by a computing device, and may be embodied as computer-readable instructions stored on a non-transitory memory device. Referring now to FIG. 11, an example system for providing intersection mitigation for a vehicle as a computing device 1104 is schematically illustrated. The example computing device 1104 provides a system for providing intersection mitigation for a vehicle, and/or a non-transitory computer usable medium having computer readable program code for providing intersection mitigation for a vehicle embodied as hardware, software, and/or firmware, according to embodiments shown and described herein. While in some embodiments, the computing device 1104 may be configured as a general purpose computer with the requisite hardware, software, and/or firmware, in some embodiments, the computing device 1104 may be configured as a special purpose computer designed specifically for performing the functionality described herein. It should be understood that the software, hardware, and/or firmware components depicted in FIG. 11 may also be provided in other computing devices external to the computing device 1104 (e.g., data storage devices, remote server computing devices, and the like).

As also illustrated in FIG. 11, the computing device 1104 (or other additional computing devices) may include a processor 1118, input/output hardware 1120, network interface hardware 1122, a data storage data storage component 1124 (which may include location data 1126 (e.g., GPS data), high definition HD map data 1128 (e.g., data including lidar data sets, vector data within a vector layer, and other map data), and any other data 1130 for performing the functionalities described herein), and a non-transitory memory component 1106. The non-transitory memory component 1106 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

Additionally, the non-transitory memory component 1106 may be configured to store operating logic 1108, mitigation logic 1110 for producing the desired output, traffic light logic 1112 for calculating a violation confidence value and applying the message, warn and intervene logic, and cross traffic logic for calculating a collision confidence value and determine whether to message, warn or intervene (each of which may be embodied as computer readable program code, firmware, or hardware, as an example). It should be understood that the data storage component 1124 may reside local to and/or remote from the computing device 1104, and may be configured to store one or more pieces of data for access by the computing device 1104 and/or other components.

A local interface 1116 is also included in FIG. 11 and may be implemented as a bus or other interface to facilitate communication among the components of the computing device 1104.

The processor 1118 may include any processing component configured to receive and execute computer readable code instructions (such as from the data storage component 1124 and/or non-transitory memory component 1106). The input/output hardware 1120 may include virtual reality headset, graphics display device, keyboard, mouse, printer, camera, microphone, speaker, touch-screen, and/or other device for receiving, sending, and/or presenting data. The network interface hardware 1122 may include any wired or wireless networking hardware, such as a modem, LAN port, wireless fidelity (Wi-Fi) card, WiMax card, mobile communications hardware, and/or other hardware for communicating with other networks and/or devices.

Included in the non-transitory memory component 1106 may be the operating logic 1108, data mitigation logic 1110, traffic light logic 1112, and cross traffic logic 1114. The operating logic 1108 may include an operating system and/or other software for managing components of the computing device 1104. Similarly, the mitigation logic 1110 may reside in the non-transitory memory component 1106 and may be configured to produce the message, warning and intervention outputs. The traffic light logic 1112 also may reside in the non-transitory memory component 1106 and may be configured to calculate a violation confidence value and apply the message, warn and intervene logic. The cross traffic logic 1114 includes logic to calculate a collision confidence value and determine whether to message, warn or intervene.

The components illustrated in FIG. 10 are merely exemplary and are not intended to limit the scope of this disclosure. More specifically, while the components in FIG. 10 are illustrated as residing within the computing device 1104, this is a non-limiting example. In some embodiments, one or more of the components may reside external to the computing device 1104.

It should now be understood that embodiments of the present disclosure are directed to systems and methods for providing intersection mitigation for a vehicle that eliminates or substantially minimizes false positive warnings or interventions. More particularly, the embodiments of the present disclosure only enable the intersection mitigation features when the vehicle is present within an intersection zone. When the vehicle is not within an intersection zone the intersection features, such as a traffic light feature or a cross traffic feature, are disabled. This prevents erroneous messages, warnings and/or interventions from occurring when the vehicle is not proximate an intersection. To further reduce false positives, embodiment employ logic to determine when to produce a message, produce a warning and produce an intervention.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of providing intersection mitigation for a vehicle, the method comprising:

receiving vehicle location data;

comparing the vehicle location data to map data, wherein the map data comprises a plurality of intersection zones, each intersection zone encompassing an intersection between two or more roads;

when the vehicle location data indicates the vehicle is outside of an intersection zone of the plurality of intersection zones, disabling one or more real-time intersection mitigation features; and when the vehicle location data indicates that the vehicle is within an intersection zone of the plurality of intersection zones, enabling the one or more real-time intersection mitigation features.

2. The method of claim 1, wherein each intersection zone is defined by a radius surrounding an individual intersection.

3. The method of claim 1, wherein the one or more intersection mitigation features comprises one or more of a traffic light mitigation feature and a cross traffic mitigation feature.

4. The method of claim 3, wherein the traffic light mitigation feature is operable to provide one or more of an informing message, a warning, and an intervention.

5. The method of claim 1, wherein the one or more intersection mitigation features comprises a traffic light mitigation feature, and the method further comprises, receiving sensor data indicating a status of a traffic light and, when the vehicle location data indicates that the vehicle is within an intersection zone, issuing a traffic light informing message when the status of the traffic light is red or yellow.

6. The method of claim 1, wherein the one or more intersection mitigation features comprises a traffic light mitigation feature, and the method further comprises, receiving sensor data indicating a status of a traffic light and, when the vehicle location data indicates that the vehicle is within an intersection zone, issuing a traffic light warning when one or more of the following are true:

the vehicle is currently applying an intervention; and the vehicle is not currently applying an intervention, a violation confidence is above a threshold, and the status of the traffic light is red or yellow.

7. The method of claim 6, wherein the violation confidence is based on a last intervention time defined by a required stopping position, a current state of the vehicle, and dynamic limits of the vehicle.

8. The method of claim 1, wherein the one or more intersection mitigation features comprises a traffic light mitigation feature, and the method further comprises, receiving sensor data indicating a status of a traffic light and, when the vehicle location data indicates that the vehicle is within an intersection zone, applying an intervention when the vehicle is not currently intervening and a driver of the vehicle is not accelerating the vehicle, the status of the traffic light is red or yellow and an amount of braking for stopping at the intersection is within a vehicle capability, and when:

the driver is not applying a brake pedal, a violation confidence is above a first threshold and the driver is applying the brake pedal, the violation confidence is above a second threshold that is greater than the first threshold, and the violation confidence is above the first threshold and less than the second threshold, and the amount of braking for stopping at the intersection is below a braking threshold.

9. The method of claim 1, wherein the one or more intersection mitigation features comprises a cross traffic mitigation feature, and the method further comprises receiving sensor data indicating an obstacle within a lane of the vehicle and, when the vehicle location data indicates that the vehicle is within an intersection zone, applying an intervention when an amount of braking for stopping before the obstacle is within a vehicle capability, a collision confidence is greater than a threshold, and the obstacle overlaps with a lane of the vehicle by a threshold value.

10. The method of claim 1, wherein each intersection zone is defined in the map data as a geometric region surrounding an intersection, and the one or more intersection mitigation features are enabled only when the vehicle is located within the intersection zone.

11. A vehicle comprising:

a location sensor;

one or more processors; and a memory storing instructions that, when executed by the one or more processors, cause the one or more processors to:

receive vehicle location data from the location sensor;

compare the vehicle location data to map data, wherein the map data comprises a plurality of intersection zones, each intersection zone encompassing an intersection between two or more roads;

when the vehicle location data indicates the vehicle is outside of an intersection zone of the plurality of intersection zones, disable one or more intersection real-time mitigation features; and when the vehicle location data indicates that the vehicle is within an intersection zone of the plurality of intersection zones, enable the one or more intersection real-time mitigation features.

12. The vehicle of claim 11, wherein each intersection zone is defined by a radius surround an individual intersection.

13. The vehicle of claim 11, wherein the one or more intersection mitigation features comprises one or more of a traffic light mitigation feature and a cross traffic mitigation feature.

14. The vehicle of claim 13, wherein the traffic light mitigation feature is operable to provide one or more of an informing message, a warning, and an intervention.

15. The vehicle of claim 14, wherein:

the informing message comprises a visual message displayed on an electronic display of the vehicle;

the warning comprises the visual message displayed on the electronic display and one or more of an audio warning produced by an audio device of the vehicle and haptic feedback produced by a haptic actuator of the vehicle; and the intervention comprises autonomously apply brakes to the vehicle.

16. The vehicle of claim 11, wherein the one or more intersection mitigation features comprises a traffic light mitigation feature, and the instructions further cause the one or more processors to receive sensor data indicating a status of a traffic light and, when the vehicle location data indicates that the vehicle is within an intersection zone, issue a traffic light informing message when the status of the traffic light is red or yellow.

17. The vehicle of claim 11, wherein the one or more intersection mitigation features comprises a traffic light mitigation feature, and the instructions further cause the one or more processors to receive sensor data indicating a status of a traffic light and, when the vehicle location data indicates that the vehicle is within an intersection zone, issue a traffic light warning when one or more of the following are true:

the vehicle is currently applying an intervention; and the vehicle is not currently apply an intervention, a violation confidence is above a threshold, and the status of the traffic light is red or yellow.

18. The vehicle of claim 17, wherein the violation confidence is based on a last intervention time defined by a required stop position, a current state of the vehicle, and dynamic limits of the vehicle.

19. The vehicle of claim 11, wherein the one or more intersection mitigation features comprises a traffic light mitigation feature, and the instructions further cause the one or more processors to receive sensor data indicating a status of a traffic light and, when the vehicle location data indicates that the vehicle is within an intersection zone, apply an intervention when the vehicle is not currently intervening and a driver of the vehicle is not accelerating the vehicle, the status of the traffic light is red or yellow and an amount of braking for stopping at the intersection is within a vehicle capability, and when:

the driver is not apply a brake pedal, a violation confidence is above a first threshold and the driver is applying the brake pedal, the violation confidence is above a second threshold that is greater than the first threshold, and the violation confidence is above the first threshold and less than the second threshold, and the amount of braking for stopping at the intersection is below a braking threshold.

20. The vehicle of claim 11, wherein the one or more intersection mitigation features comprises a cross traffic mitigation feature, and the instructions further cause the one or more processors to receive sensor data indicating an obstacle within a lane of the vehicle and, when the vehicle location data indicates that the vehicle is within an intersection zone, apply an intervention when an amount of braking for stopping before the obstacle is within a vehicle capability, a collision confidence is greater than a threshold, and the obstacle overlaps with a lane of the vehicle by a threshold value.

* * * * *